(12) United States Patent
Levy et al.

(10) Patent No.: US 7,925,424 B2
(45) Date of Patent: Apr. 12, 2011

(54) AUTOMATIC DETERMINATION OF MAJOR TAXI-PATHS FROM AIRCRAFT SURVEILLANCE DATA

(75) Inventors: Benjamin S. Levy, East Syracuse, NY (US); David B. Rappaport, Campbell, CA (US); Collen J. Knickerbocker, Fayetteville, NY (US)

(73) Assignee: Sensis Corporation, East Syracuse, NY (US)

( * ) Notice: Subject to any disclaimer, the term of this patent is extended or adjusted under 35 U.S.C. 154(b) by 537 days.

(21) Appl. No.: 12/018,824

(22) Filed: Jan. 24, 2008

(65) Prior Publication Data
US 2009/0192701 A1    Jul. 30, 2009

(51) Int. Cl.
*G06G 7/76* (2006.01)
(52) U.S. Cl. ......... 701/117; 701/118; 701/201; 701/206
(58) Field of Classification Search ............... 701/3, 14, 701/15, 16, 117, 118, 120, 201, 206; 244/158.1, 244/75.1
See application file for complete search history.

(56) References Cited

U.S. PATENT DOCUMENTS

| 6,246,320 B1 * | 6/2001 | Monroe | 340/506 |
| 6,253,064 B1 * | 6/2001 | Monroe | 455/66.1 |
| 6,392,692 B1 * | 5/2002 | Monroe | 348/143 |

OTHER PUBLICATIONS

Levy, Benjamin S., et al., "Arrival Time Estimation (ETA) from On-Final to Ramp," American Institute of Aeronautics and Astronautics, pp. 1-15, Sep. 12, 2007.
Levy, Benjamin, et al., "Quantification and Forecasting of Emissions from Taxiing Aircraft," Confirmation paper nr 46, pp. 1-5, Dec. 8, 2007.

\* cited by examiner

*Primary Examiner* — Gertrude Arthur Jeanglaud
(74) *Attorney, Agent, or Firm* — Burr & Brown (57) ABSTRACT

A method and computer program using airport surveillance data to define common paths taken by vehicles on the airport surface is presented. Position data points for a group of vehicles create separate paths for each of the vehicles in the group. A matrix is created including areas measured between the path of each vehicle in the group and each of the remaining vehicles in the group. A column-wise average for each of the columns in the matrix is calculated, the column having a lowest mean average of all of the columns is determined, and a vector A(J) including the areas and vehicle identifications is created from that column. A difference vector $\delta A(J)$ is created having the difference between successive entries in the vector A(J), and subgroups with the group are recursively identified using the values in the difference vector.

12 Claims, 5 Drawing Sheets

In accordance with one embodiment of the present invention, a method is provided for using airport surveillance data to define common paths taken by vehicles on an airport surface movement area. The method includes a set of steps beginning with the step of accessing a collected data set of position data points for a plurality of vehicles operating on the airport surface movement area. Each of the plurality of vehicles has similar origins and similar destinations to one another. A path for each of the plurality of vehicles between the origin and the destination is created using the position data points, an area between the path of each vehicle and the path of each of the other vehicles is measured, and a minimum area criterion is defined based on the physical dimensions of runways and taxi-paths that comprise the airport surface area.

The method further includes a step of recursively performing a process including a plurality of steps beginning with (a) defining a tentative group including N vehicles, an initial tentative group including all of the vehicles present in the collected data set, subsequent tentative groups being defined in step (j). The next step includes (b) creating a matrix including the areas measured between the path of each vehicle in the tentative group and each of the remaining vehicles in the tentative group. The matrix created in step (b) has N rows and N columns such that each of the vehicles in the tentative group has a respective row and a respective column. The next steps include (c) calculating a column-wise mean average for each of the columns in the matrix, and (d) determining which column has a lowest mean average of all of the columns in the matrix. The next step includes (e) creating a vector $A(J)$ including the areas, along with their respective vehicle identifications, from the column having the lowest mean average. The vector $A(J)$ has the areas arranged in a numerically ascending order. The next step includes (f) creating a difference vector $\delta A(J)$ corresponding to the vector $A(J)$. Each of the values in the difference vector $\delta A(J)$ is the difference between successive entries in the vector $A(J)$. The next step includes (g) determining whether any of the values in the difference vector $\delta A(J)$ are greater than the minimum area criterion. The next steps include (h) defining the tentative group as a confirmed group if none of the values in the difference vector $\delta A(J)$ is greater than the minimum area criterion, and (i) removing the confirmed group from further processing. The next step includes (j) defining a number of new groups if one or more values in the difference vector $\delta A(J)$ is greater than the minimum area criterion. The number of new groups equals (the number of values in the difference vector $\delta A(J)$ being greater than the minimum area variable) plus (one). The new groups include successive vehicles from the vector $A(J)$. The groups are divided at the vehicle or vehicles having a value in the difference vector $\delta A(J)$ being greater than the minimum area such that the vehicle or vehicles having a value in the difference vector $\delta A(J)$ being greater than the minimum area is a first vehicle in a subsequent one of the new groups. The next step includes (k) recursively processing each of the number of new groups separately as a tentative group beginning with step (a).

Preferably, the method further includes the step of saving the data on the vehicles included in each of the confirmed groups onto a computer-readable medium for at least one of review by an individual, production of a graphical display on a computer terminal identifying the paths of vehicles included in each of the confirmed groups, and production of a presentation document identifying the paths of vehicles included in each of the confirmed groups.

In accordance with one embodiment of the present invention, the plurality of vehicles is a plurality of aircraft. Accordingly, the method determines groups of aircraft having similar taxi paths.

In accordance with one embodiment of the present invention, the position data used in the method is surveillance data provided by an airport surveillance system. Preferably, the airport surveillance system is a multilateration or ADS-B system, such that high-quality and extensive surface surveillance position data are available.

In accordance with one embodiment of the present invention, the paths of vehicles included in each of the confirmed groups are overlaid onto a map onto a map of the airport surface movement area. Accordingly, the paths of the confirmed groups can be easily identified and compared with respect to one another using information provided on the map of the airport surface movement area. Preferably, the paths of vehicles included in each of the confirmed groups are identified in one of the graphical display and the presentation document by an average of each of the paths of the confirmed groups. The manual process of identifying taxi paths from flight data superimposed upon an airport surface map is an extraordinarily tedious and subjective task that is not reproducible or objective.

In accordance with one embodiment of the present invention, a computer program is provided using airport surveillance data to define common paths taken by vehicles on an airport surface movement area. The computer program includes means for accessing a collected data set of position data points for a plurality of vehicles operating on the airport surface movement area, each of the plurality of vehicles having similar origins and similar destinations to one another, means for creating a path for each of the plurality of vehicles between the origin and the destination using the position data points, and means for measuring an area between the path of each vehicle and the path of each of the other vehicles.

The computer program further includes means for recursively performing a process including: (a) means for defining a tentative group including N vehicles, an initial tentative group including all of the vehicles present in the collected data set; (b) means for creating a matrix including the areas measured between the path of each vehicle in the tentative group and each of the remaining vehicles in the tentative group, the matrix having N rows and N columns such that each of the vehicles in the tentative group has a respective row and a respective column; (c) means for calculating a column-wise mean average for each of the columns in the matrix; (d) means for determining which column has a lowest mean average of all of the columns in the matrix; (e) means for creating a vector $A(J)$ including the areas, along with their respective vehicle identifications, from the column having the lowest mean average, the vector $A(J)$ having the areas arranged in a numerically ascending order; (f) means for creating a difference vector $\delta A(J)$ corresponding to the vector $A(J)$, each of the values in the difference vector $\delta A(J)$ being the difference between successive entries in the vector $A(J)$; (g) means for determining whether any of the values in the difference vector $\delta A(J)$ are greater than a minimum area criterion; (h) means for defining the tentative group as a confirmed group if none of the values in the difference vector $\delta A(J)$ is greater than the minimum area criterion; (i) means for removing the confirmed group from further processing; (j) means for defining a number of new groups if one or more values in the difference vector $\delta A(J)$ is greater than the minimum area variable, the number of new groups equaling (the number of values in the difference vector $\delta A(J)$ being greater than the minimum area criterion) plus (one), the new groups including successive vehicles from the vector A(J), the groups being divided at the vehicle or vehicles having a value in the difference vector δA(J) being greater than the minimum area such that the vehicle or vehicles having a value in the difference vector δA(J) being greater than the minimum area is a first vehicle in a subsequent one of the new groups; and (k) means for recursively processing each of the number of new groups separately as a tentative group beginning with step (a).

The computer program further includes means for saving the vehicles included in each of the confirmed groups onto a computer-readable medium for at least one of review by an individual, production of a graphical display on a computer terminal identifying the paths of vehicles included in each of the confirmed groups, and production of a presentation document identifying the paths of vehicles included in each of the confirmed groups.

In accordance with one embodiment of the present invention, the vehicles are aircraft.

In accordance with one embodiment of the present invention, the position data used by the computer program is surveillance data provided by an airport surveillance system. Preferably, the airport surveillance system is a multilateration or ADS-B system.

In accordance with one embodiment of the present invention, the computer program further includes means for overlaying the paths of vehicles included in each of the confirmed groups onto a map of the airport surface movement area.

In accordance with one embodiment of the present invention, the computer program further includes means for averaging the paths of vehicles included in each of the confirmed groups identified. Preferably, the computer system further includes means for providing the average in one of the graphical display and the presentation document.

BRIEF DESCRIPTION OF THE DRAWINGS

For a fuller understanding of the nature and objects of the invention, reference should be made to the following detailed description of a preferred mode of practicing the invention, read in connection with the accompanying drawings in which.

DETAILED DESCRIPTION OF THE INVENTION

Figure 1:
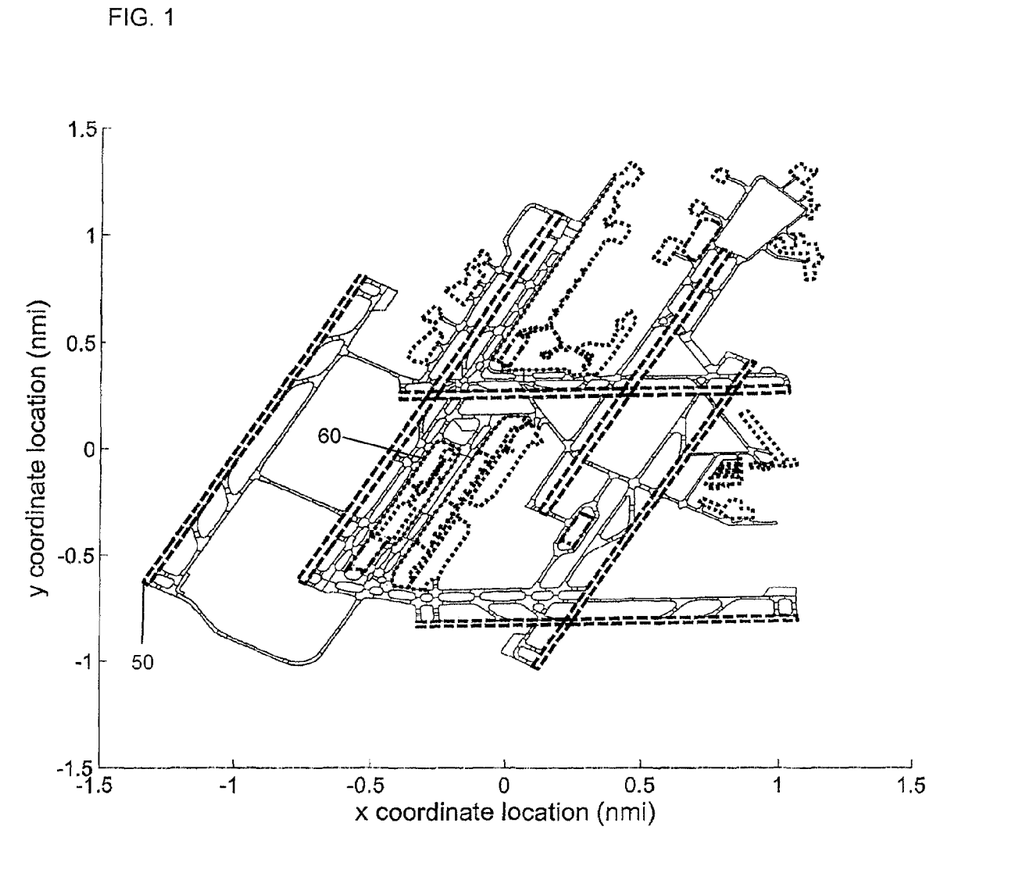
FIG. 1 is a graphical representation of an airport surface environment to be included as part of a presentation document made in accordance with the present invention.
Figure 2:
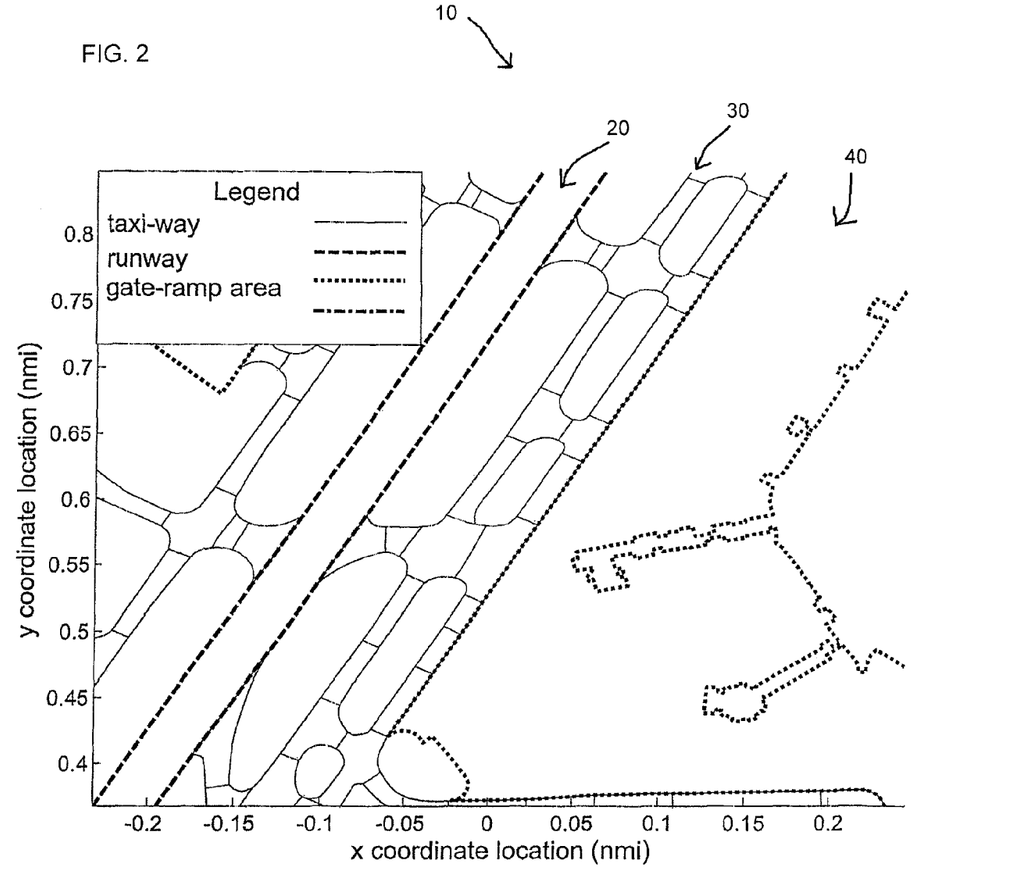
FIG. 2 is a larger-scaled section of the graphical representation shown in FIG. 1.

As shown in FIGS. 1 and 2, a complex, modern airport surface environment 10 includes runways 20 and gate-ramp areas 40 connected to one another by taxiways 30. Many vehicles, such as aircraft, baggage carts, fuel trucks, maintenance vehicles, etc. operate on the airport surface environment. While it should be understood that the present invention can be used to analyze the movement of all types of vehicles, the present invention will be more fully discussed below with reference to aircraft. For example, during a typical arrival flight operation, an aircraft (not shown) lands on one of the runways 20, exits the runway 20 onto one of the taxiways 30 as directed by an air traffic controller (not shown). Once off the runway 20, the air traffic controller will provide the pilot of the aircraft with taxi instructions including a sequence of taxiways 30 that the pilot must follow to the gate-ramp area 40. Similarly, a typical departure flight operation includes sequence of taxiways 30 that a pilot is directed to follow from the gate-ramp area 40 to the runway 20. The actual route taken by the aircraft from/to the runway 20 to/from the gate-ramp area 40 is called an aircraft taxi path.

The taxi path of an arriving aircraft will vary due to airport conditions such as runway usage, departing traffic, weather conditions, etc. The present invention provides a method for obtaining documentation, in electronic and/or hard copy form, identifying the specific taxi paths used by aircraft under particular airport conditions. Groupings of similar aircraft taxi paths can be determined and presented for either arriving or departing aircraft using the present invention.

The present invention can be in the form of a computer program stored on physical media readable by a computer device as would be well known in the art. The concrete and tangible output of the method of the present invention and/or the computer program of the present invention can preferably be a physical document for use by a reviewer to alter future aircraft taxi paths and/or to change the design of the airport surface environment in an effort to reduce waste, to consistently predict aircraft time to be spent during taxi, and to increase safety. Similarly, the concrete and tangible output of the method of the present invention and/or the computer program of the present invention can be a graphical representation indicating groups of defined aircraft taxi paths that are output to a hard copy, displayed onto a computer terminal, and/or saved onto a computer readable medium for use by a user for the reasons outlined above.

Position data for every arriving and departing aircraft at a particular airport is created and saved using known multilateration equipment sold by Sensis Corporation, for example. The Sensis multilateration equipment uses a signal received from an aircraft's transponder system to create a position data point set including (i) an aircraft flight number, (ii) X and Y coordinates of the aircraft at a particular time, and (iii) a time stamp indicating the time that the position data is recorded. One position data point is created and stored for every aircraft operating on and around the airport surface environment at a nominal update rate that results in very good spatial resolution. All of the position data point sets for a given time period are saved together as a collected data set. It should be understood that similar information can also be obtained by commercially available ADS-B equipment.

Preferably, the X and Y coordinates of each position data point set are created in relation to a Cartesian plane aligned such that the center (i.e., X,Y=0,0) is located near the system center, which is the target processor of the multilateration system. The Cartesian plane can also be centered at any other location, as long all of the saved X and Y coordinates are made in relation to the same Cartesian plane.

For the purpose of the present invention, the collected data set must initially be sorted into groups relevant to the desired output. As discussed above, the output of the present invention is a concrete indication of taxi paths used by air traffic control under a particular set of circumstances. For example, the collected data set can be sorted into groups such as: all arrivals to runway 4L 50 (FIG. 1); all arrivals to runway 4R; all departures using runway 4L 50; etc. As in the present case, the data can be further sorted into more specific groups, such as: all arrivals to runway 4L 50 with a destination of the south terminal 60 (FIG. 1); all arrivals to runway 4L 50 with a destination of the north terminal; etc. Even further, they can be sorted into groups such as: all arrivals to runway 4L 50 with a destination of the south terminal 60 during daylight hours; all arrivals to runway 4L 50 with a destination of the south terminal 60 during nighttime hours. Depending on the specificity being sought, these groups can be further segregated depending on weather conditions such as: clear skies; rain; snow; low ceilings; low visibility, etc.

While it should be understood that the present invention can be utilized to define the taxi paths used by air traffic controllers in any combination of circumstances experienced at an airport, only one will be discussed further in an effort to create a particular example as a reference. Specifically, the remainder of the discussion will be focused on an example of determining the taxi paths used by air traffic controllers at Detroit Metropolitan Wayne County Airport (DTW) for the movement of aircraft arriving to a particular runway (runway 4L 50) and taxiing to a particular terminal area (i.e., the south terminal 60). The collected data set can be manually or automatically sorted using any of the known methods to extract individual flight data sets for aircraft fitting these criteria. This step is identified at step 100 in the flow chart of FIG. 3. Again, even though this particular group is limited to flights having the same runway and ramp locations, the present invention can similarly be used with data selected using different criteria.

In the following example, the taxi paths of twenty eight aircraft will be analyzed to determine the preferred taxi paths used by the air traffic controllers for aircraft arriving on runway 4L 50 and taxiing to the south terminal 60. To avoid confusion, this initial grouping of twenty eight aircraft will be called the Initial Group. It should be understood that the present invention can be used to analyze larger and smaller numbers of vehicles and/or aircraft.

Figure 4:
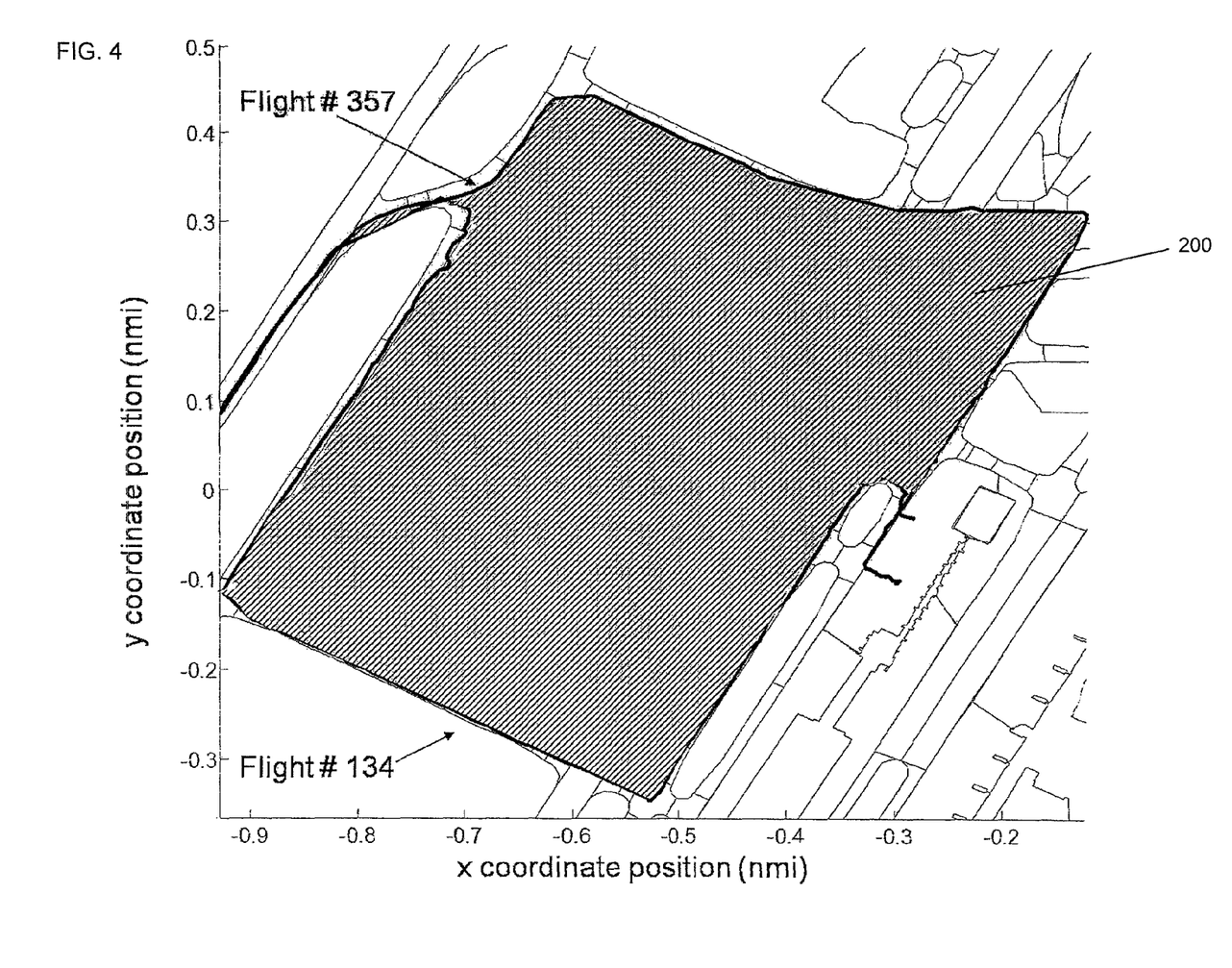
FIG. 4 is a graphical representation of an inter-flight area formed between two individual and taxi path lines calculated in accordance with the present invention.

According to a first step 110 of the present invention, an individual aircraft taxi path line is generated for each aircraft from its respective individual flight data set. The individual taxi path line of a particular aircraft is then added to an individual taxi path line from each and every other aircraft separately to define individual, separate polygons. An inter-flight area 200 defined at its outer limits by each of these polygons is identified and saved. For example, as shown in FIG. 4, an inter-flight area 200 is calculated based on the area inside the polygon defined by the taxi path of Flight No. 357, and the taxi path of Flight No. 134, (see FIG. 4). In other words, an inter-flight area 200, such as the one shown in FIG. 4, is defined for every combination of the twenty eight individual aircraft taxi paths. A simplified example is as follows:

TABLE 1

Areas Computed Between Example Flight No. 1 and Example Flight Nos. 2-4

| Example Flight No. 2 | Area of the polygon created by the taxi path of Flight No. 1 and the taxi path of Flight No. 2 |
|---|---|
| Example Flight No. 3 | Area of the polygon created by the taxi path of Flight No. 1 and the taxi path of Flight No. 3 |
| Example Flight No. 4 | Area of the polygon created by the taxi path of Flight No. 1 and the taxi path of Flight No. 4 |

With reference to the twenty eight aircraft in the Initial Group of the present invention, the Table 2, shown below, includes the inter-flight areas defined between Flight No. 101, and each of Flight Nos. 116-367. The actual value of each inter-flight area can be determined, for example, by using the Polyarea function of MatLab by MathWorks, Inc.

TABLE 2

Areas Computed Between Flight No. 101 and Flight Nos. 116-367

| Flight No. | Area (nm$^2$) |
|---|---|
| 116 | 0.312 |
| 127 | 0.466 |
| 134 | 0.341 |
| 255 | 0.335 |
| 256 | 0.338 |
| 266 | 0.010 |
| 268 | 0.032 |
| 274 | 0.031 |
| 279 | 0.393 |
| 288 | 0.382 |
| 290 | 0.364 |
| 291 | 0.341 |
| 293 | 0.425 |
| 303 | 0.312 |
| 313 | 0.412 |
| 317 | 0.339 |
| 330 | 0.400 |
| 332 | 0.346 |
| 335 | 0.410 |
| 336 | 0.395 |
| 339 | 0.029 |
| 342 | 0.348 |
| 344 | 0.340 |
| 346 | 0.342 |
| 351 | 0.400 |
| 357 | 0.036 |
| 367 | 0.022 |

Completing step 110 is to place the each of the possible inter-flight areas defined by the aircraft in the Initial Group into a matrix A(i,j). While the actual matrix A(i,j) is shown in Table 4,, the following Table 3, provides a simplified brief example using the Example Flight Nos. shown in Table 1, above.

TABLE 3

Example Matrix A(i,j) Created Referencing Example Flights 1-4 from Table 1

| A(i, j) | Flight No. 1 | Flight No. 2 | Flight No. 3 | Flight No. 4 |
|---|---|---|---|---|
| Flight No 1 | Area will be 0 because these are the same flight | Area between Flight No. 2 and Flight No. 1 | Area between Flight No. 3 and Flight No. 1 | Area between Flight No. 4 and Flight No. 1 |
| Flight No. 2 | Area between Flight No. 1 and Flight No. 2 | Area will be 0 because these are the same flight | Area between Flight No. 3 and Flight No. 2 | Area between Flight No. 4 and Flight No. 2 |
| Flight No. 3 | Area between Flight No. 1 and Flight No. 3 | Area between Flight No. 2 and Flight No. 3 | Area will be 0 because these are the same flight | Area between Flight No. 4 and Flight No. 3 |

TABLE 3-continued

Example Matrix A(i,j) Created Referencing Example Flights 1-4 from Table 1

| A(i, j) | Flight No. 1 | Flight No. 2 | Flight No. 3 | Flight No. 4 |
|---|---|---|---|---|
| Flight No. 4 | Area between Flight No. 1 and Flight No. 4 | Area between Flight No. 2 and Flight No. 4 | Area between Flight No. 3 and Flight No. 4 | Area will be 0 because these are the same flight |

Figure 3:
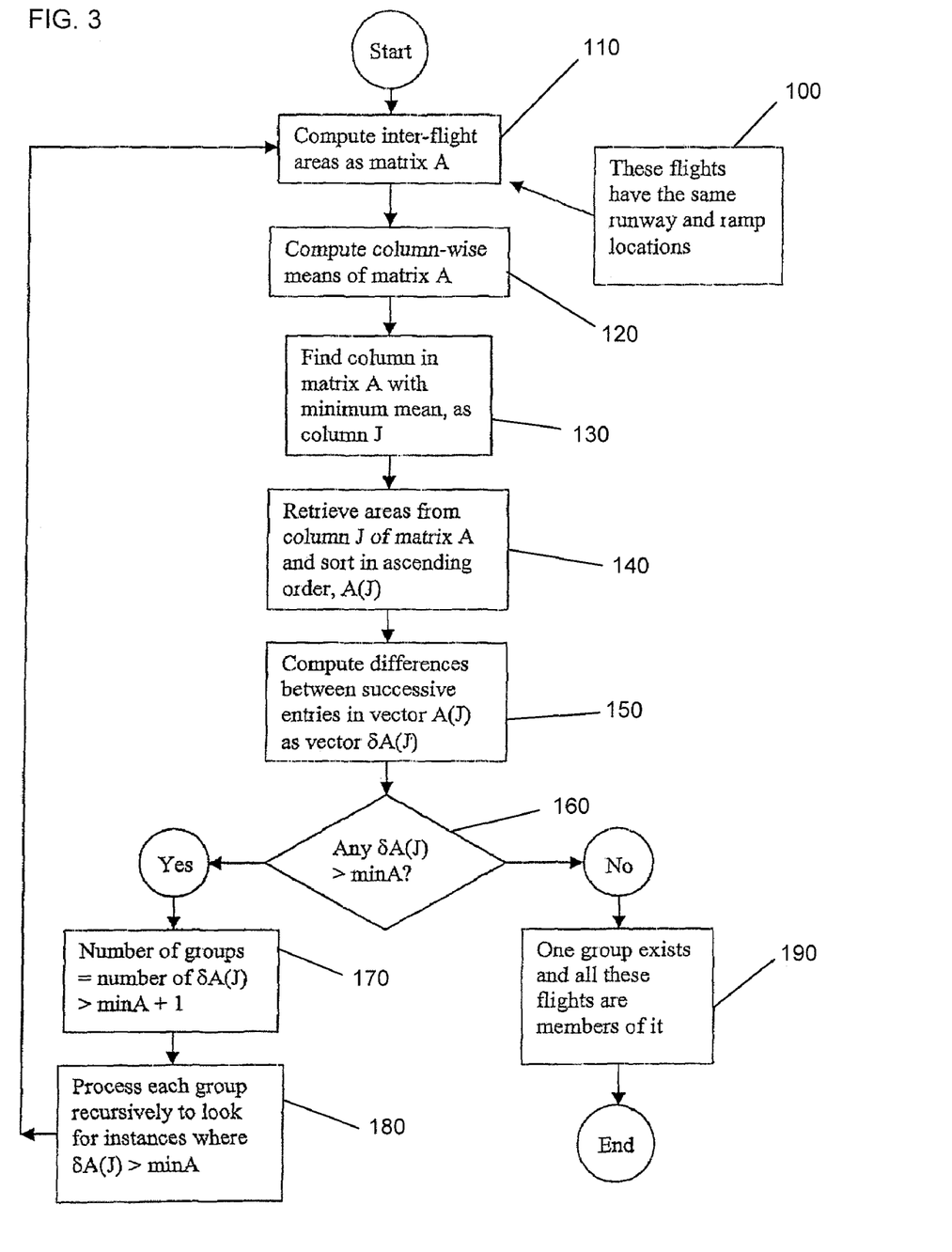
FIG. 3 is flow chart of the method for creating taxi path presentation documents in accordance with the present invention.

As mentioned above, Table 4, shows the matrix A(i,j) of an Initial Group formed using the inter-flight areas of Flight numbers 101-367, according to step 110 in the flow chart of FIG. 3. Please note that several columns have purposely been removed to enhance clarity of the table. For the proper function of the present invention, all of the columns would preferably be present for the next steps.

TABLE 4

Matrix A(i, j) Containing the Inter-Aircraft Areas Including the Twenty Eight Aircraft Identified as the Initial Group.
All Values in $nm^2$

| A(i, j) Initial Group Flight No. (Col/Row No.) | 101 (1) | 116 (2) | ... | 268 (8) | ... | 351 (26) | 357 (27) | 367 (28) |
|---|---|---|---|---|---|---|---|---|
| 101 (1) | 0.000 | 0.312 | ... | 0.032 | ... | 0.400 | 0.036 | 0.022 |
| 116 (2) | 0.312 | 0.000 | ... | 0.298 | ... | 0.668 | 0.329 | 0.304 |
| 127 (3) | 0.466 | 0.757 | ... | 0.454 | ... | 0.148 | 0.487 | 0.451 |
| 134 (4) | 0.341 | 0.028 | ... | 0.327 | ... | 0.695 | 0.353 | 0.332 |
| 255 (5) | 0.335 | 0.022 | ... | 0.321 | ... | 0.689 | 0.339 | 0.325 |
| 256 (6) | 0.338 | 0.033 | ... | 0.324 | ... | 0.693 | 0.344 | 0.328 |
| 266 (7) | 0.010 | 0.305 | ... | 0.021 | ... | 0.388 | 0.040 | 0.038 |
| 268 (8) | 0.032 | 0.298 | ... | 0.000 | ... | 0.374 | 0.037 | 0.019 |
| 274 (9) | 0.031 | 0.328 | ... | 0.051 | ... | 0.359 | 0.026 | 0.038 |
| 279 (10) | 0.393 | 0.704 | ... | 0.407 | ... | 0.061 | 0.406 | 0.403 |
| 288 (11) | 0.382 | 0.667 | ... | 0.363 | ... | 0.053 | 0.396 | 0.363 |
| 290 (12) | 0.364 | 0.678 | ... | 0.374 | ... | 0.032 | 0.408 | 0.379 |
| 291 (13) | 0.341 | 0.026 | ... | 0.327 | ... | 0.696 | 0.351 | 0.349 |
| 293 (14) | 0.425 | 0.734 | ... | 0.432 | ... | 0.070 | 0.407 | 0.428 |
| 303 (15) | 0.312 | 0.003 | ... | 0.297 | ... | 0.666 | 0.324 | 0.302 |
| 313 (16) | 0.412 | 0.722 | ... | 0.425 | ... | 0.057 | 0.429 | 0.420 |
| 317 (17) | 0.339 | 0.026 | ... | 0.326 | ... | 0.694 | 0.349 | 0.329 |
| 330 (18) | 0.400 | 0.710 | ... | 0.407 | ... | 0.092 | 0.387 | 0.403 |
| 332 (19) | 0.346 | 0.034 | ... | 0.332 | ... | 0.701 | 0.344 | 0.336 |
| 335 (20) | 0.410 | 0.708 | ... | 0.409 | ... | 0.057 | 0.421 | 0.405 |
| 336 (21) | 0.395 | 0.673 | ... | 0.375 | ... | 0.056 | 0.411 | 0.373 |
| 339 (22) | 0.029 | 0.307 | ... | 0.010 | ... | 0.376 | 0.044 | 0.019 |
| 342 (23) | 0.348 | 0.034 | ... | 0.333 | ... | 0.702 | 0.345 | 0.338 |
| 344 (24) | 0.340 | 0.023 | ... | 0.325 | ... | 0.694 | 0.346 | 0.329 |
| 346 (25) | 0.342 | 0.037 | ... | 0.328 | ... | 0.697 | 0.347 | 0.332 |
| 351 (26) | 0.400 | 0.668 | ... | 0.374 | ... | 0.001 | 0.409 | 0.382 |
| 357 (27) | 0.036 | 0.329 | ... | 0.037 | ... | 0.409 | 0.000 | 0.050 |
| 367 (28) | 0.022 | 0.304 | ... | 0.019 | ... | 0.382 | 0.050 | 0.000 |
| Column Mean | 0.282 | 0.338 | ... | 0.276 | ... | 0.390 | 0.292 | 0.278 |

According to step 120 in FIG. 3, an average value for each of the columns of the matrix A(i,j) is determined. The mean values for each of the columns are shown below in Table 5, and are shown in the last row in the matrix A(i,j) shown in Table 4. Please note that for the sake of space in the remaining iterations of the invention discussed below, a separate table will not be provided listing the column-wise mean value. Rather, these values will only be included as the last row of the inter-flight area matrix A(i,j).

TABLE 5

Averages Values for Each of the Columns in the Matrix A(i, j)

| Column No. | Flight No. | Mean ($nm^2$) |
|---|---|---|
| 1 | 101 | 0.282 |
| 2 | 116 | 0.338 |
| 3 | 127 | 0.467 |
| 4 | 134 | 0.352 |
| 5 | 255 | 0.346 |
| 6 | 256 | 0.350 |
| 7 | 266 | 0.280 |
| 8 | 268 | 0.276 |
| 9 | 274 | 0.280 |
| 10 | 279 | 0.405 |
| 11 | 288 | 0.385 |
| 12 | 290 | 0.386 |
| 13 | 291 | 0.354 |
| 14 | 293 | 0.423 |
| 15 | 303 | 0.338 |
| 16 | 313 | 0.418 |
| 17 | 317 | 0.351 |
| 18 | 330 | 0.411 |
| 19 | 332 | 0.353 |
| 20 | 335 | 0.407 |
| 21 | 336 | 0.391 |
| 22 | 339 | 0.278 |
| 23 | 342 | 0.353 |
| 24 | 344 | 0.350 |
| 25 | 346 | 0.352 |
| 26 | 351 | 0.390 |
| 27 | 357 | 0.292 |
| 28 | 367 | 0.278 |

In the next step referenced as 130 in FIG. 3, the column having the smallest mean is identified. In the present iteration, column 8, has the smallest mean, 0.276 $nm^2$. The purpose of selecting the smallest mean is to identify the aircraft taxi path, in this case Aircraft No. 268, which travels the closest to the taxi paths of the remaining aircraft resulting in the smallest average area.

In the next step referenced as 140 in FIG. 3, inter-flight areas provided in column 8, from Table 4, are arranged in ascending numerical order based on the inter-flight area to create a vector A(J). Further, according to the next step referenced as 150 in FIG. 3, differences between successive entries in vector A(J) are calculated as difference vector δA(J), as shown below in Table 6:

TABLE 6

Areas Provided in Column 8 Sorted by Increasing Area

| Flight No. | Area ($nm^2$) A(J) | Difference ($nm^2$) δA(J) | Group Assigned |
|---|---|---|---|
| 268 | Column Flight | | Group 1 |
| 339 | 0.010 | Ref. Flt. | (tentative) |
| 367 | 0.019 | 0.009 | |
| 266 | 0.021 | 0.002 | |
| 101 | 0.032 | 0.011 | |
| 357 | 0.037 | 0.004 | |
| 274 | 0.051 | 0.014 | |

TABLE 6-continued

Areas Provided in Column 8 Sorted by Increasing Area

| Flight No. | Area (nm$^2$) A(J) | Difference (nm$^2$) δA(J) | Group Assigned |
|---|---|---|---|
| 303 | 0.297 | 0.246 | "Not Group 1" |
| 116 | 0.298 | 0.001 | |
| 255 | 0.321 | 0.022 | |
| 256 | 0.324 | 0.003 | |
| 344 | 0.325 | 0.001 | |
| 317 | 0.326 | 0.001 | |
| 134 | 0.327 | 0.001 | |
| 291 | 0.327 | 0.000 | |
| 346 | 0.328 | 0.001 | |
| 332 | 0.332 | 0.004 | |
| 342 | 0.333 | 0.001 | |
| 288 | 0.363 | 0.030 | |
| 290 | 0.367 | 0.004 | |
| 351 | 0.374 | 0.007 | |
| 336 | 0.375 | 0.001 | |
| 330 | 0.407 | 0.032 | |
| 279 | 0.407 | 0.000 | |
| 335 | 0.409 | 0.002 | |
| 313 | 0.425 | 0.016 | |
| 293 | 0.432 | 0.007 | |
| 127 | 0.454 | 0.022 | |

In Table 6, the flight associated with the selection of column 8, (i.e., Flight No. 268) is referred to as the Column Flight and is not used in differentiating the data within this column. Instead, all of the area differences are taken with respect to Flight No. 339, which has the smallest area with respect to the Column Flight. The Flight No. having the smallest area with respect to the Column Flight (i.e., Flight No. 339, in the present instance) is referred to as the Reference Flight (Ref. Flt.) for a particular column.

According to step 160 in FIG. 3, the difference vector δA(J) is examined to determine whether the aircraft of the Initial Group can be sorted into subgroups depending on the particular values within the difference vector δA(J). According to step 170 in FIG. 3, the number of groups is identified as the number of values in the vector δA(J) having a value greater than a minimum area criterion min(A) plus one. The minimum area criterion min(A) was determined by the inventors to be 0.05, nm$^2$ for the present example. This will be discussed in greater detail below. According to Table 6, it can be seen that one value in the difference vector δA(J) has a value greater than the minimum area criterion minA (i.e., 0.05, nm$^2$) such that the number of groups is necessarily 2. Accordingly, the first group (i.e. tentative Group 1) of aircraft is identified as including the aircraft in the vector A(J) provided in Table 6, located before the aircraft in the vector A(J) having a successive difference greater than the minimum area criterion minA. A second group (i.e. Not Group 1) would then be identified as including all of the remaining aircraft in the vector A(J) beginning with the aircraft having the successive difference greater than the minimum area criterion minA of 0.05, nm$^2$. This results in a tentative Group 1, including seven aircraft (268, 339, 367, 266, 101, 357, and 274) and a Not Group 1, including twenty one aircraft (303, 116, 255, 256, 344, 317, 134, 291, 346, 332, 342, 288, 290, 351, 336, 330, 279, 335, 313, 293, and 127). Because there are two groups of aircraft, according to step 180 in FIG. 3, each of the two groups are recursively processed to determine if there are any subgroups present in either of the groups.

Before discussing the recursive processing of the individual groups, it should be noted that the minimum area criterion minA can vary depending on the airport surface environment. For example, the inventors have determined that a value for the minimum area criterion minA in the present instance should be approximately 0.05 nm$^2$. This value can vary depending on variables such as (i) the dimensions of taxiway (e.g., the width), (ii) actual deviations in the aircraft location on the taxiway, (iii) equipment measurement errors, (iv) actual destination in the ramp area, etc. Accordingly, while setting the value of the minimum area criterion minA at 0.05, nm$^2$ should work for most, if not all, airports, the value can be reduced if groups are missed or enlarged if multiple groups are identified within a group of aircraft following the same taxi path. Therefore, it should be understood that different values may be used successfully depending on the length of the taxi path lines and the complexity of the airport surface area.

In the recursive testing, each of the newly determined groups is processed in the same manner as the original group of twenty eight aircraft. For example, the tentative Group 1, will be processed using the data from only those seven aircraft determined to be present in the tentative Group 1. According to steps 110 and 120 in FIG. 3, a matrix A(i,j) is created including the inter-flight area of the seven aircraft in tentative Group 1,, and the column-wise means of the matrix A(i,j) are calculated and included in the last row.

TABLE 7

Matrix A(i, j) Containing the Inter-Aircraft Areas Including Only the Seven Aircraft Identified Above as Tentative Group 1.
All Values in nm$^2$

| A(i, j) Group 1 (tentative) Flight No. (Col/Row No.) | 268 (1) | 339 (2) | 367 (3) | 266 (4) | 101 (5) | 357 (6) | 274 (7) |
|---|---|---|---|---|---|---|---|
| 268 (1) | 0.000 | 0.010 | 0.019 | 0.021 | 0.032 | 0.037 | 0.051 |
| 339 (2) | 0.010 | 0.000 | 0.019 | 0.023 | 0.029 | 0.044 | 0.051 |
| 367 (3) | 0.019 | 0.019 | 0.000 | 0.038 | 0.022 | 0.050 | 0.038 |
| 266 (4) | 0.021 | 0.023 | 0.038 | 0.000 | 0.010 | 0.040 | 0.026 |
| 101 (5) | 0.032 | 0.029 | 0.022 | 0.010 | 0.000 | 0.036 | 0.031 |
| 357 (6) | 0.037 | 0.044 | 0.050 | 0.040 | 0.036 | 0.000 | 0.026 |
| 274 (7) | 0.051 | 0.051 | 0.038 | 0.026 | 0.031 | 0.026 | 0.000 |
| Column Mean | 0.024 | 0.025 | 0.026 | 0.023 | 0.023 | 0.033 | 0.032 |

According to steps 130 in FIG. 3, column 4, of the matrix A(i,j) shown in Table 7 is identified at the column having the smallest mean. According to steps 140 and 150 in FIG. 3, the inter-flight areas in column 4, from Table 7, are arranged in numerical order according to the inter-flight area to form a vector A(J) and differences between each successive area values are calculated and included as difference vector δA(J), as shown in Table 8. Please note that for all analyses after the initial sorting (i.e., Table 6), the first entry in the new list is not used for computation of the area differences. As discussed above, the first unused entry (i.e., Column Flight) in the undivided original data set is Flight No. 268. After dividing the original data set into tentative Group 1, and Not Group 1, the Column Flight for tentative Group 1, will be Flight No. 266, because column 4, (i.e., the column including areas defined between Flight No. 266, and the remaining aircraft in the group) has the smallest average area based on the remaining columns in Table 7. Therefore, the Reference Flight from which the area differences are computed will become Flight No. 101, in Table 8.

13

TABLE 8

Areas Provided in Column 4 Sorted by Increasing Area

| Flight No. | Area (nm$^2$) A(J) | Difference (nm$^2$) δA(J) | Group Assigned |
|---|---|---|---|
| 266 | Column Flight | | Group 1 |
| 101 | 0.010 | Ref. Flt. | (confirmed) |
| 268 | 0.021 | 0.011 | |
| 339 | 0.023 | 0.002 | |
| 274 | 0.026 | 0.003 | |
| 367 | 0.038 | 0.012 | |
| 357 | 0.040 | 0.002 | |

Because all of the successive difference values in difference vector δA(J) provided in Table 8, are less than the minimum area criterion minA of 0.05, nm$^2$, it can now be confirmed that all of the Flight Nos. originally identified at tentative Group 1 are, in fact, confirmed as members of Group 1. According to steps 160 and 190 in FIG. 3, no further recursive processing of data relating to these seven aircraft will be performed.

The group identified as Not Group 1, is similarly recursively processed using the data from only those twenty one aircraft determined to be present in Not Group 1. According to steps 110 and 120 a matrix A(i,j) is created, as shown in Table 9, including the inter-flight areas defined by every combination of the twenty one aircraft, and column-wise means for calculated and the values have been placed in the last row of the matrix A(i,j). Because this matrix, shown in Table 9, below, is very large, several columns have been removed for clarity.

TABLE 9

Matrix A(i, j) Containing the Inter-Aircraft Areas Including Only the Twenty One Aircraft Identified Above as Not Group 1.
All Values in nm$^2$

| A(i, j) "Not Group 1" Flight No. (Col/Row No.) | 303 (1) | 116 (2) | ... | 332 (10) | ... | 293 (20) | 127 (21) |
|---|---|---|---|---|---|---|---|
| 303 (1) | 0.000 | 0.003 | ... | 0.035 | ... | 0.735 | 0.751 |
| 116 (2) | 0.003 | 0.000 | ... | 0.034 | ... | 0.734 | 0.757 |
| 255 (3) | 0.023 | 0.022 | ... | 0.012 | ... | 0.750 | 0.775 |
| 256 (4) | 0.027 | 0.033 | ... | 0.020 | ... | 0.755 | 0.778 |
| 344 (5) | 0.028 | 0.023 | ... | 0.018 | ... | 0.757 | 0.779 |
| 317 (6) | 0.033 | 0.026 | ... | 0.016 | ... | 0.761 | 0.779 |
| 134 (7) | 0.031 | 0.028 | ... | 0.012 | ... | 0.764 | 0.781 |
| 291 (8) | 0.031 | 0.026 | ... | 0.023 | ... | 0.762 | 0.782 |
| 346 (9) | 0.036 | 0.037 | ... | 0.013 | ... | 0.758 | 0.782 |
| 332 (10) | 0.035 | 0.034 | ... | 0.000 | ... | 0.755 | 0.786 |
| 342 (11) | 0.036 | 0.034 | ... | 0.010 | ... | 0.758 | 0.787 |
| 288 (12) | 0.662 | 0.667 | ... | 0.695 | ... | 0.069 | 0.152 |
| 290 (13) | 0.668 | 0.678 | ... | 0.700 | ... | 0.066 | 0.108 |
| 351 (14) | 0.666 | 0.668 | ... | 0.701 | ... | 0.070 | 0.148 |
| 336 (15) | 0.672 | 0.673 | ... | 0.706 | ... | 0.068 | 0.165 |
| 330 (16) | 0.710 | 0.710 | ... | 0.730 | ... | 0.049 | 0.137 |
| 279 (17) | 0.704 | 0.704 | ... | 0.739 | ... | 0.040 | 0.169 |
| 335 (18) | 0.706 | 0.708 | ... | 0.741 | ... | 0.035 | 0.150 |
| 313 (19) | 0.722 | 0.722 | ... | 0.756 | ... | 0.033 | 0.149 |
| 293 (20) | 0.735 | 0.734 | ... | 0.755 | ... | 0.000 | 0.165 |
| 127 (21) | 0.751 | 0.757 | ... | 0.786 | ... | 0.165 | 0.751 |
| Column Mean | 0.347 | 0.347 | ... | 0.357 | ... | 0.423 | 0.471 |

According to step 130 in FIG. 3, column 1, of the matrix A(i,j) shown in Table 9 is identified at the column having the smallest mean. According to steps 140 and 150 in FIG. 3, the inter-flight areas in column 1, from Table 9, are arranged in numerical order according to the inter-flight areas in a vector A(J), and the differences between successive values in the vector A(J) are calculated and included in Table 10, as the difference vector δA(J). Please note that information relating to Flight No. 303, (i.e., Column Flight of Table 10) is not used and that the first flight used for the basis to calculate the successive difference is Flight No. 116, (i.e., Reference Flight of Table 10).

TABLE 10

Areas Provided in Column 1 of Table 9 Sorted by Increasing Area

| Flight No. | Area (nm$^2$) A(J) | Difference (nm$^2$) δA(J) | Group Assigned |
|---|---|---|---|
| 303 | Column Flight | | Group 2 |
| 116 | 0.003 | Ref. Flt. | (tentative) |
| 255 | 0.024 | 0.021 | |
| 256 | 0.027 | 0.003 | |
| 344 | 0.028 | 0.001 | |
| 291 | 0.031 | 0.003 | |
| 134 | 0.031 | 0.001 | |
| 317 | 0.033 | 0.002 | |
| 332 | 0.035 | 0.002 | |
| 342 | 0.036 | 0.001 | |
| 346 | 0.036 | 0.000 | |
| 288 | 0.662 | 0.626 | "Not Group 2" |
| 351 | 0.666 | 0.004 | |
| 290 | 0.668 | 0.001 | |
| 336 | 0.672 | 0.004 | |
| 279 | 0.704 | 0.033 | |
| 335 | 0.706 | 0.002 | |
| 330 | 0.710 | 0.004 | |
| 313 | 0.722 | 0.012 | |
| 293 | 0.735 | 0.013 | |
| 127 | 0.751 | 0.016 | |

According to step 160 in FIG. 3, the difference vector δA(J) is examined to determine whether the aircraft of Not Group 1, can be sorted into subgroups depending on the particular values within the difference vector δA(J). In the present case, there is one value (i.e., 0.626, nm$^2$, of Flight No. 288) within the difference vector δA(J) having a value greater than the minimum area criterion minA of 0.05, nm$^2$. According to step 170, the aircraft in Table 10, are separated into two groups such that a tentative Group 2, includes the first eleven aircraft in the vector A(J) up to, but not including Flight No. 288, having the value in the difference vector greater than the minimum area criterion minA of 0.05, nm$^2$. A Not Group 2, includes the remaining ten aircraft in the vector A(J) beginning with Flight No. 288. According to step 180 in FIG. 3, the tentative Group 2, and the Not Group 2, will each be recursively processed to determine whether subgroups are present.

The tentative Group 2, is now processed in a manner similar to the tentative Group 1, above. Accordingly, a matrix A(i,j) is created using the data from only those eleven aircraft determined to be present in the tentative Group 2. Because this matrix, shown in Table 10, below, remains vary large, several columns have been removed for clarity.

TABLE 11

Matrix A(i, j) Containing the Inter-Aircraft Areas Including Only the Eleven Aircraft Identified Above as Tentative Group 2.
All Values in nm$^2$

| A(i, j) Group 2 (tentative) Flight No. (Col/Row No.) | 255 (1) | 134 (2) | 344 (3) | ... | 346 (8) | ... | 303 (11) |
|---|---|---|---|---|---|---|---|
| 255 (1) | 0.000 | 0.003 | 0.023 | ... | 0.033 | ... | 0.036 |
| 134 (2) | 0.003 | 0.000 | 0.022 | ... | 0.026 | ... | 0.037 |
| 344 (3) | 0.023 | 0.022 | 0.000 | ... | 0.014 | ... | 0.019 |
| 332 (4) | 0.027 | 0.033 | 0.021 | ... | 0.021 | ... | 0.010 |

TABLE 11-continued

Matrix A(i, j) Containing the Inter-Aircraft Areas Including Only the
Eleven Aircraft Identified Above as Tentative Group 2.
All Values in nm$^2$ A(i, j)
Group 2
(tentative)
Flight No. 255
(Col/Row No.) (1) 134 (2) 344 (3) ... 346 (8) ... 303 (11)

| | | | | | | | |
|---|---|---|---|---|---|---|---|
| 342 (5) | 0.028 | 0.023 | 0.012 | ... | 0.019 | ... | 0.019 |
| 317 (6) | 0.031 | 0.026 | 0.019 | ... | 0.012 | ... | 0.027 |
| 291 (7) | 0.031 | 0.028 | 0.009 | ... | 0.012 | ... | 0.014 |
| 346 (8) | 0.033 | 0.026 | 0.014 | ... | 0.000 | ... | 0.017 |
| 256 (9) | 0.035 | 0.034 | 0.012 | ... | 0.016 | ... | 0.013 |
| 116 (10) | 0.036 | 0.034 | 0.013 | ... | 0.013 | ... | 0.011 |
| 303 (11) | 0.036 | 0.037 | 0.019 | ... | 0.033 | ... | 0.000 |
| Column Mean | 0.026 | 0.024 | 0.015 | ... | 0.017 | ... | 0.018 |

According to step 130 in FIG. 3, column 3, of the matrix A(i,j) shown in Table 11, is identified as the column having the smallest mean. According to steps 140 and 150 in FIG. 3, the inter-flight areas in column 3, from Table 11, are arranged in numerical order according to the inter-flight area to form a vector A(J), and differences between each successive area values are calculated and included as difference vector δA(J), as shown in Table 12. Please note that information relating to Flight No. 255, is not used and that the first flight used for the basis to calculate the successive difference is Flight No. 134.

TABLE 12

Areas Provided in Column 3 Sorted by Increasing Area

| Flight No. | Area (nm$^2$) A(J) | Difference (nm$^2$) δA(J) | Group Assigned |
|---|---|---|---|
| 255 | Column Flight | | Group 2 |
| 134 | 0.009 | Ref. Flt. | (confirmed) |
| 344 | 0.012 | 0.003 | |
| 332 | 0.012 | 0.000 | |
| 342 | 0.013 | 0.001 | |
| 317 | 0.014 | 0.001 | |
| 291 | 0.019 | 0.005 | |
| 346 | 0.019 | 0.000 | |
| 256 | 0.021 | 0.003 | |
| 116 | 0.022 | 0.000 | |
| 303 | 0.024 | 0.002 | |

Because all of the successive difference values in the difference vector δA(J) provided in Table 12, are less than the minimum area criterion minA of 0.05, nm$^2$, it can now be confirmed that all of the Flight Nos. originally identified at tentative Group 2, are, in fact, confirmed members of Group 2.

The group identified as Not Group 2, is similarly processed using the data from only those ten aircraft determined to be present in Not Group 2. According to steps 110 and 120 a matrix A(i,j) is created, as shown below in Table 13. Because this matrix is very large, several columns have been removed for clarity.

TABLE 13

Matrix A(i, j) Containing the Inter-Aircraft Areas Including Only the
Ten Aircraft Identified Above as Not Group 2.
All Values in nm$^2$ A(i, j)
"Not Group 2"
Flight No. 335
(Col/Row No.) (1) 313 (2) ... 290 (6) ... 330 (9) 127 (10)

| | | | | | | | |
|---|---|---|---|---|---|---|---|
| 335 (1) | 0.000 | 0.053 | ... | 0.058 | ... | 0.069 | 0.152 |
| 313 (2) | 0.053 | 0.001 | ... | 0.057 | ... | 0.070 | 0.148 |
| 279 (3) | 0.049 | 0.032 | ... | 0.055 | ... | 0.066 | 0.108 |
| 293 (4) | 0.064 | 0.056 | ... | 0.040 | ... | 0.068 | 0.165 |
| 336 (5) | 0.050 | 0.061 | ... | 0.030 | ... | 0.040 | 0.169 |
| 290 (6) | 0.058 | 0.057 | ... | 0.000 | ... | 0.035 | 0.150 |
| 351 (7) | 0.090 | 0.092 | ... | 0.072 | ... | 0.049 | 0.137 |
| 288 (8) | 0.063 | 0.057 | ... | 0.023 | ... | 0.033 | 0.149 |
| 330 (9) | 0.069 | 0.070 | ... | 0.035 | ... | 0.000 | 0.165 |
| 127 (10) | 0.152 | 0.148 | ... | 0.150 | ... | 0.165 | 0.000 |
| Column Mean | 0.065 | 0.063 | ... | 0.052 | ... | 0.059 | 0.134 |

According to step 130 in FIG. 3, column 6, of the matrix A(i,j) shown in Table 13, is identified as the column having the smallest mean. According to steps 140 and 150 in FIG. 3, the inter-flight areas in column 6, from Table 13, are arranged in numerical order according to the inter-flight areas in a vector A(J), and differences between successive values in the vector A(J) are calculated and included in Table 14 as the difference vector δA(J). Please note that information relating to Flight No. 335 is not used and that the first flight used for the basis to calculate the successive difference is Flight No. 313.

TABLE 14

Areas Provided in Column 6 of Table 13 Sorted by Increasing Area

| Flight No. | Area (nm$^2$) A(J) | Difference (nm$^2$) δA(J) | Group Assigned |
|---|---|---|---|
| 335 | Column Flight | | Group 3 |
| 313 | 0.023 | Ref. Flt. | (tentative) |
| 279 | 0.030 | 0.007 | |
| 293 | 0.035 | 0.005 | |
| 336 | 0.040 | 0.005 | |
| 290 | 0.055 | 0.014 | |
| 351 | 0.057 | 0.002 | |
| 288 | 0.058 | 0.002 | |
| 330 | 0.072 | 0.014 | |
| 127 | 0.150 | 0.078 | "Not Group 3" |

According to steps 160 and 170 in FIG. 3, it can be seen that the there is one value in the difference vector δA(J) having a value greater than the minimum area criterion minA of 0.05, nm$^2$, indicating that two groups are present, a tentative Group 3 and a Not Group 3.

The tentative Group 3, is now processed in a manner similar to the tentative Groups 1, and 2, above. Accordingly, a matrix A(i,j) is created using the data from only those nine aircraft determined to be present in the tentative Group 3. Because this matrix, shown in Table 14, below, remains vary large, several columns have been removed for clarity.

TABLE 15

Matrix A(i, j) Containing the Inter-Aircraft Areas Including Only the Nine Aircraft Identified Above as Tentative Group 3.
All Values in nm$^2$

| A(i, j) Group 3 (tentative) Flight No. (Col/Row No.) | 279 (1) | 313 (2) | 335 (3) | ... | 330 (6) | ... | 351 (9) |
|---|---|---|---|---|---|---|---|
| 279 (1) | 0.000 | 0.023 | 0.030 | ... | 0.055 | ... | 0.072 |
| 313 (2) | 0.023 | 0.000 | 0.024 | ... | 0.070 | ... | 0.066 |
| 335 (3) | 0.030 | 0.024 | 0.000 | ... | 0.056 | ... | 0.051 |
| 293 (4) | 0.035 | 0.033 | 0.040 | ... | 0.066 | ... | 0.049 |
| 288 (5) | 0.040 | 0.050 | 0.056 | ... | 0.045 | ... | 0.100 |
| 330 (6) | 0.055 | 0.070 | 0.056 | ... | 0.000 | ... | 0.053 |
| 336 (7) | 0.057 | 0.057 | 0.061 | ... | 0.032 | ... | 0.092 |
| 290 (8) | 0.058 | 0.063 | 0.050 | ... | 0.049 | ... | 0.090 |
| 351 (9) | 0.072 | 0.066 | 0.051 | ... | 0.053 | ... | 0.000 |
| Column Mean | 0.041 | 0.043 | 0.041 | ... | 0.047 | ... | 0.064 |

According to step 130 in FIG. 3, column 3, of the matrix A(i,j) shown in Table 14, is identified as the column having the smallest mean. According to steps 140 and 150 in FIG. 3, the inter-flight areas in column 3, from Table 14, are arranged in numerical order according to the inter-flight areas to form a vector A(J), and the differences between successive areas are calculated and included as difference vector δA(J), as shown in Table 16. Please note that information relating to Flight No. 279, is not used and that the first flight used for the basis to calculate the successive difference is Flight No. 313.

TABLE 16

Areas Provided in Column 3 of Table 15 Sorted by Increasing Area

| Flight No. | Area (nm$^2$) A(J) | Difference (nm$^2$) δA(J) | Group Assigned |
|---|---|---|---|
| 279 | Column Flight | | Group 3 |
| 313 | 0.024 | Ref. Flt. | (Confirmed) |
| 335 | 0.030 | 0.006 | |
| 293 | 0.040 | 0.010 | |
| 288 | 0.050 | 0.010 | |
| 330 | 0.051 | 0.001 | |
| 336 | 0.056 | 0.005 | |
| 290 | 0.056 | 0.001 | |
| 351 | 0.061 | 0.005 | |

Because all of the values in the difference vector δA(J) provided in Table 15 are less than the minimum area criterion minA of 0.05, nm$^2$, it can now be confirmed that all of the Flight Nos. originally identified at tentative Group 3, are, in fact, confirmed members of Group 3.

As shown in Table 14, Not Group 3, contains only one Flight No. Therefore, because a successive difference can not be determined, the sole aircraft in Not Group 3, can be confirmed as the sole member of a Group 4, and the recursive processing of the data is complete.

Figure 5:
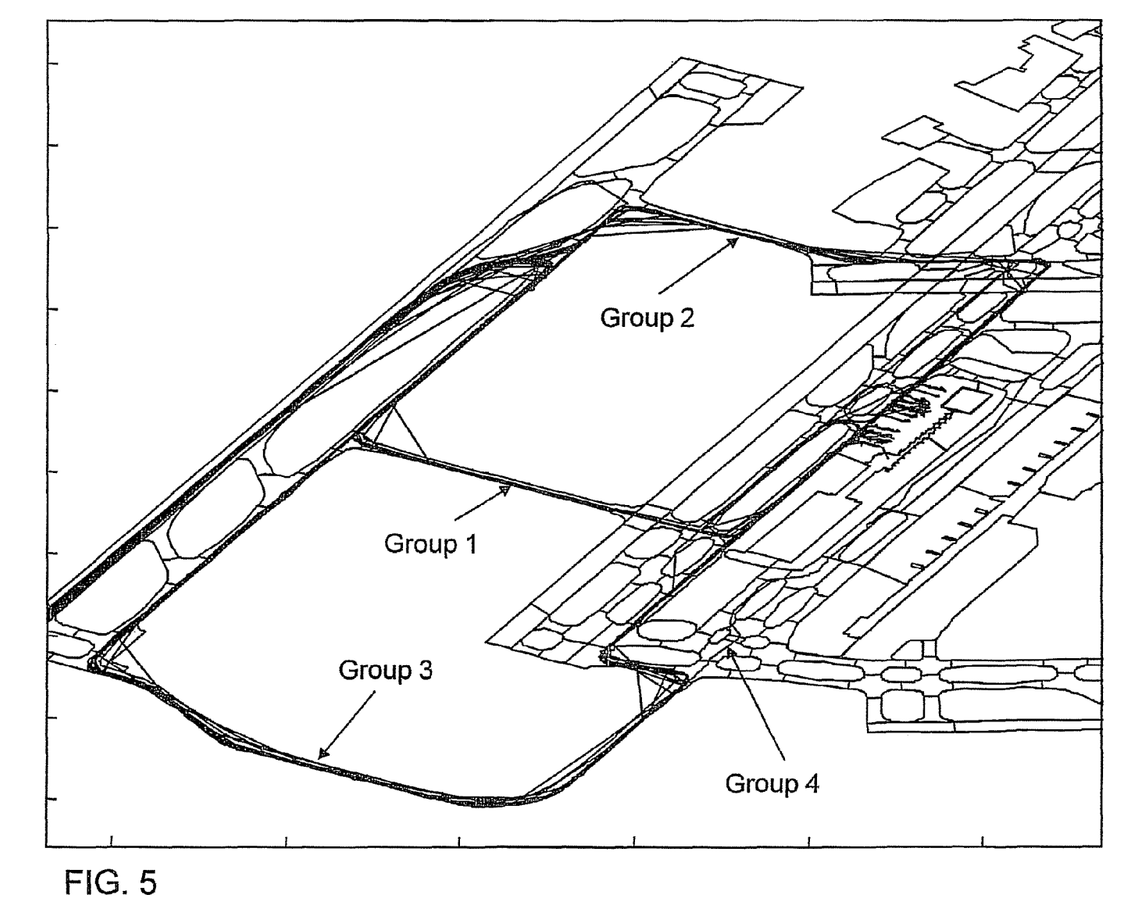
FIG. 5 is a presentation document created in accordance with the present invention.

An output of the confirmed groups of aircraft is then output to a computer storage means, a computer display, and/or computer printing device. The output can take the form of the X/Y positional for each aircraft flight number along with the identified group number. Similarly, the output can be graphically depicted such that a plot of each aircraft is graphically depicted on an airport surface area chart, as shown in FIG. 5. Further, as shown in FIG. 5, each of the confirmed groups of aircraft taxi paths (i.e. Group 1, Group 2,, Group 3, and Group 4) are identified for easy identification by a viewer. Similarly, it should be understood that a representative flight path for each group may be depicted on the airport surface area chart if it is determined that including every flight results in an output that is cluttered or otherwise unclear.

While the present invention has been particularly shown and described with reference to the preferred mode as illustrated in the drawings, it will be understood by one skilled in the art that various changes may be effected therein without departing from the spirit and the scope of the invention as defined by the claims.

What is claimed is:

1. A method of using airport surveillance data to define common paths taken by vehicles on an airport surface movement area, the method comprising:
   accessing a collected data set of position data points for a plurality of vehicles operating on the airport surface movement area, each of the plurality of vehicles having similar origins and similar destinations to one another;
   creating a path for each of the plurality of vehicles between the origin and the destination using the position data points;
   measuring an area between the path of each vehicle and the path of each of the other vehicles;
   defining a minimum area criterion based on the airport surface area;
   recursively performing a process comprising the steps of:
   (a) defining a tentative group including N vehicles, an initial tentative group including all of the vehicles present in the collected data set, subsequent tentative groups being defined in step (j);
   (b) creating a matrix including the areas measured between the path of each vehicle in the tentative group and each of the remaining vehicles in the tentative group, the matrix having N rows and N columns such that each of the vehicles in the tentative group has a respective row and a respective column;
   (c) calculating a column-wise mean average for each of the columns in the matrix;
   (d) determining which column has a lowest mean average of all of the columns in the matrix;
   (e) creating a vector A(J) including the areas, along with their respective vehicle identifications, from the column having the lowest mean average, the vector A(J) having the areas arranged in a numerically ascending order;
   (f) creating a difference vector δA(J) corresponding to the vector A(J), each of the values in the difference vector δA(J) being the difference between successive entries in the vector A(J);
   (g) determining whether any of the values in the difference vector δA(J) are greater than the minimum area criterion;
   (h) defining the tentative group as a confirmed group if none of the values in the difference vector δA(J) is greater than the minimum area criterion;
   (i) removing the confirmed group from further processing;
   (j) defining a number of new groups if one or more values in the difference vector SA(J) is greater than the minimum area variable, the number of new groups equaling (the number of values in the difference vector δA(J) being greater than the minimum area criterion) plus (one), the new groups including successive vehicles from the vector A(J), the groups being divided at the vehicle or vehicles having a value in the difference vector δA(J) being greater than the minimum area such that the vehicle or vehicles having a value in the difference vector δA(J) being greater than the minimum area is a first vehicle in a subsequent one of the new groups, and;
(k) recursively processing each of the number of new groups separately as a tentative group beginning with step (a); and saving the vehicles included in each of the confirmed groups onto a computer readable medium for at least one of review by an individual, production of a graphical display on a computer terminal identifying the paths of vehicles included in each of the confirmed groups, and production of a presentation document identifying the paths of vehicles included in each of the confirmed groups.

2. The method of using airport surveillance data according to claim 1, wherein the vehicles are aircraft.

3. The method of using airport surveillance data according to claim 2, wherein the position data is surveillance data provided by an airport surveillance system.

4. The method of using airport surveillance data according to claim 3, wherein the airport surveillance system is a multilateration or ADS-B system.

5. The method of using airport surveillance data according to claim 1, wherein the paths of vehicles included in each of the confirmed groups are overlaid onto a map of the airport surface movement area.

6. The method of using airport surveillance data according to claim 1, wherein the paths of vehicles included in each of the confirmed groups are identified in one of the graphical display and the presentation document by an average of each of the paths of the confirmed groups.

7. A computer readable medium that executes a computer program on a computer using airport surveillance data to define common paths taken by vehicles on an airport surface movement area, the computer program comprising:

means for accessing a collected data set of position data points for a plurality of vehicles operating on the airport surface movement area, each of the plurality of vehicles having similar origins and similar destinations to one another;

means for creating a path for each of the plurality of vehicles between the origin and the destination using the position data points;

means for measuring an area between the path of each vehicle and the path of each of the other vehicles;

means for recursively performing a process comprising:
(a) means for defining a tentative group including N vehicles, an initial tentative group including all of the vehicles present in the collected data set;
(b) means for creating a matrix including the areas measured between the path of each vehicle in the tentative group and each of the remaining vehicles in the tentative group, the matrix having N rows and N columns such that each of the vehicles in the tentative group has a respective row and a respective column;
(c) means for calculating a column-wise mean average for each of the columns in the matrix;
(d) means for determining which column has a lowest mean average of all of the columns in the matrix;
(e) means for creating a vector A(J) including the areas, along with their respective vehicle identifications, from the column having the lowest mean average, the vector A(J) having the areas arranged in a numerically ascending order;
(f) means for creating a difference vector δA(J) corresponding to the vector A(J), each of the values in the difference vector δA(J) being the difference between successive entries in the vector A(J);
(g) means for determining whether any of the values in the difference vector δA(J) are greater than a minimum area criterion;
(h) means for defining the tentative group as a confirmed group if none of the values in the difference vector δA(J) is greater than the minimum area criterion;
(i) means for removing the confirmed group from further processing;
(j) means for defining a number of new groups if one or more values in the difference vector δA(J) is greater than the minimum area variable, the number of new groups equaling (the number of values in the difference vector δA(J) being greater than the minimum area criterion) plus (one), the new groups including successive vehicles from the vector A(J), the groups being divided at the vehicle or vehicles having a value in the difference vector δA(J) being greater than the minimum area such that the vehicle or vehicles having a value in the difference vector δA(J) being greater than the minimum area is a first vehicle in a subsequent one of the new groups, and;
(k) means for recursively processing each of the number of new groups separately as a tentative group beginning with step (a); and means for saving the vehicles included in each of the confirmed groups onto a computer readable medium for at least one of review by an individual, production of a graphical display on a computer terminal identifying the paths of vehicles included in each of the confirmed groups, and production of a presentation document identifying the paths of vehicles included in each of the confirmed groups.

8. The computer readable medium according to claim 7, wherein the vehicles are aircraft.

9. The computer readable medium according to claim 7, wherein the position data is surveillance data provided by an airport surveillance system.

10. The computer readable medium according to claim 9, wherein the airport surveillance system is a multilateration or ADS-B system.

11. The computer readable medium according to claim 7 further comprising means for overlaying the paths of vehicles included in each of the confirmed groups onto a map of the airport surface movement area.

12. The computer readable medium according to claim 7 further comprising means for averaging the paths of vehicles included in each of the confirmed groups identified and means for providing the average in one of the graphical display and the presentation document.

* * * * *

UNITED STATES PATENT AND TRADEMARK OFFICE
CERTIFICATE OF CORRECTION

PATENT NO. : 7,925,424 B2
APPLICATION NO. : 12/018824
DATED : April 12, 2011
INVENTOR(S) : Benjamin S. Levy and David B. Rappaport It is certified that error appears in the above-identified patent and that said Letters Patent is hereby corrected as shown below:

Column 18

*Line 59*: change "SA(J)" to --δA(J)--

Signed and Sealed this
Thirty-first Day of May, 2011

David J. Kappos
*Director of the United States Patent and Trademark Office*